United States Patent [19]

Machat

[11] 4,283,466

[45] Aug. 11, 1981

[54] CHEMICAL AND ELECTROCHEMICAL PROCESS

[75] Inventor: Jean-Yves Machat, Clermont-Ferrand, France

[73] Assignee: Compagnie Generale des Etablissements Michelin, Clermont-Ferrand, France

[21] Appl. No.: 150,233

[22] Filed: May 15, 1980

Related U.S. Application Data

[62] Division of Ser. No. 59,075, Jul. 19, 1979, Pat. No. 4,245,011.

[30] Foreign Application Priority Data

Jul. 27, 1978 [FR] France .................................. 78 22545
Jul. 27, 1978 [FR] France .................................. 78 22546

[51] Int. Cl.$^3$ ............................................. H01M 8/04
[52] U.S. Cl. ......................................... 429/15; 429/27
[58] Field of Search ........................ 429/12, 13, 15, 14, 429/17, 34, 27, 51, 70

[56] References Cited

U.S. PATENT DOCUMENTS 3,887,400  6/1975  Doniat et al. ........................ 429/15

FOREIGN PATENT DOCUMENTS 1437649  6/1976  United Kingdom .

Primary Examiner—Donald L. Walton
Attorney, Agent, or Firm—Brumbaugh, Graves, Donohue & Raymond

[57] ABSTRACT

A process for carrying out chemical and/or electrochemical reactions in a reaction chamber traversed by a suspension of particles in a fluid is improved due to the fact that the suspension emerging from the chamber is separated into two fractions: a "concentrated fraction" comprising the greater part or all of the particles and a "fluid fraction" comprising the greater part or all of the fluid. The "fluid fraction" is introduced into a reservoir. A flow of the fluid from the reservoir is combined with the "concentrated fraction" in order to form a suspension, which is then introduced into the reaction chamber.

3 Claims, 5 Drawing Figures

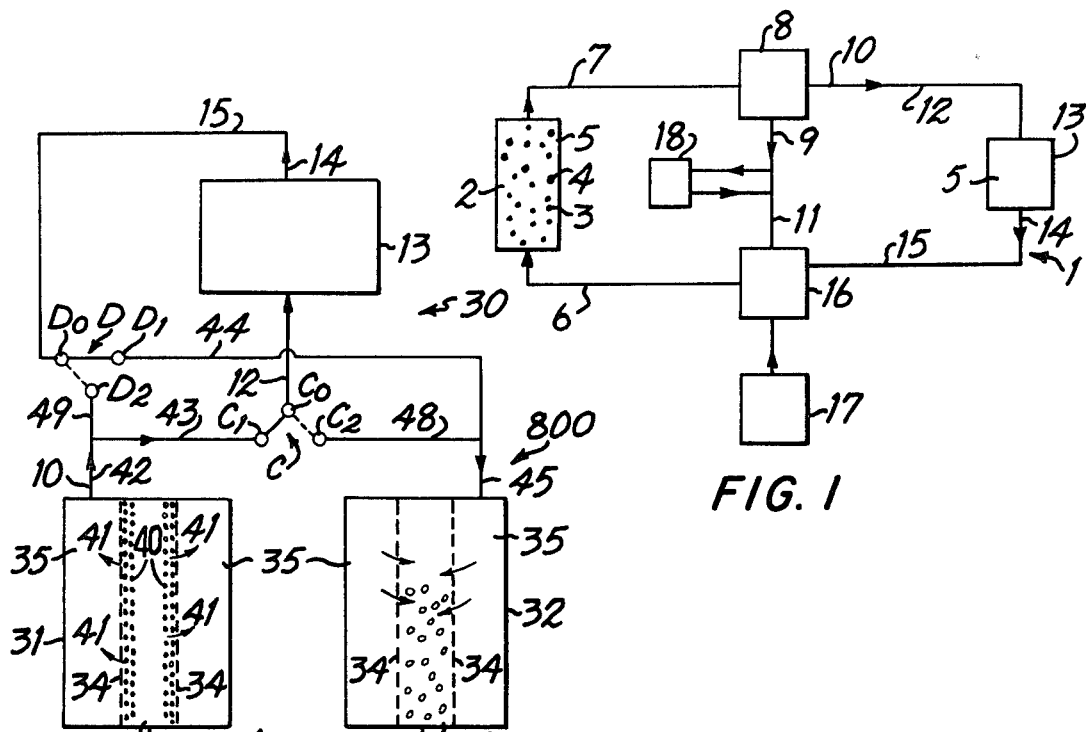
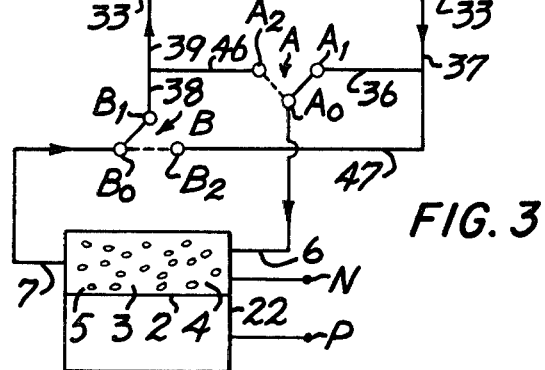
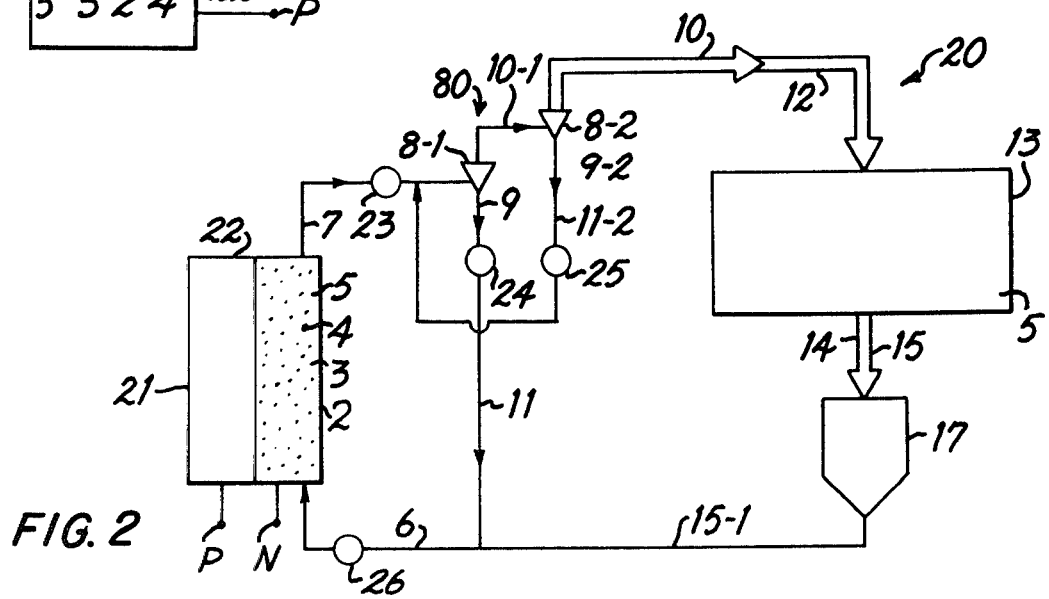

CHEMICAL AND ELECTROCHEMICAL PROCESS

This is a division of application Ser. No. 59,075, filed July 19, 1979 now U.S. Pat. No. 4,245,011.

This invention relates to chemical and/or electrochemical devices and to the processes used in said devices.

The invention relates in particular to chemical and/or electrochemical devices comprising at least one reaction chamber through which there flows a liquid or gaseous fluid in which particles are contained. The particles may be inactive, for example catalytic, or be formed at least in part by at least one active material which participates in the chemical and/or electrochemical reactions carried out in the reaction chamber. The combination of the fluid and particles is referred to hereinafter as "suspension," this very broad term applying whatever the distribution of the particles in the fluid.

By way of illustration and not of limitation such a device may be an electrochemical generator of electric current, the chamber being an electrochemical compartment and the liquid being an electrolyte. One generator of this type is, for example, a generator with dispersed negative electrode employing a suspension of particles of an active metal, in particular zinc.

These particles may be formed entirely of the metal or have, for example, an inert core, preferably an electron conductor at least on the surface, the core being covered by a layer of active metal.

In generators using a suspension of particles, it is known to employ a buffer reservoir of electrolyte and particles which is arranged in series in a path connecting the outlet of the compartment of its inlet, the suspension thus flowing in a circuit which contains the compartment and the reservoir in series.

These arrangements have the following drawbacks:

In order to obtain a satisfactory composition of the suspension at the inlet to the compartment it is necessary to maintain agitation within the reservoir, which leads to imparting the latter a well-defined form of substantial size.

The reservoir contains a large number of particles, which can lead to appreciable corrosion of these particles by the liquid, this corrosion decreasing the specific energy of the generator and possibly causing serious safety problems as a result of the liberation of explosive or toxic gases.

In order to try to decrease the weight of the generators, British Pat. No. 1,437,649 proposes decreasing the volume of electrolyte in circulation. For this purpose, the suspension of zinc particles in an alkaline electrolyte emerging from the negative compartment is introduced into a filter so as to remove a part of the electrolyte. This part of particle-free electrolyte is treated by heating in an attached device so as to cause precipitation of the zinc oxide, which is eliminated. The electrolyte which has thus been freed of this zinc oxide is again introduced into the anode compartment with the suspension of zinc emerging from the filter. Experience shows that such treatment is very difficult to carry out satisfactorily.

The purpose of the invention is to avoid the drawbacks described above.

Therefore, the process of the invention which employs chemical and/or electrochemical reactions in at least one reaction chamber traversed by a suspension of particles in a fluid, is characterized by:

(a) separating the suspension emerging from the chamber into two fractions:
one fraction, called the "concentrated fraction," comprising the greater part or all of the particles,
one fraction, called the "fluid fraction," comprising the greater part or all of the fluid;

(b) introducing the "fluid fraction" into at least one reservoir;

(c) causing a flow of fluid from the reservoir in such a manner that the reaction product or products contained in the "fluid fraction" and introduced into the reservoir with said fraction remain in the reservoir or are entrained by said flow; combining said flow with the "concentrated fraction" in order to form a suspension; and (d) introducing the suspension thus formed into the reaction chamber.

The figures of the drawing (all of which are schematic) together with their description as well as the examples which follow are intended to illustrate the invention and to facilitate an understanding thereof without, however, limiting its scope.

In the figures, all of which are schematic:

FIG. 1 shows a device in accordance with the invention;

FIG. 2 shows another device in accordance with the invention employing separator cyclones;

FIG. 3 shows in section another device in accordance with the invention employing two fixed filters;

Figure 4:
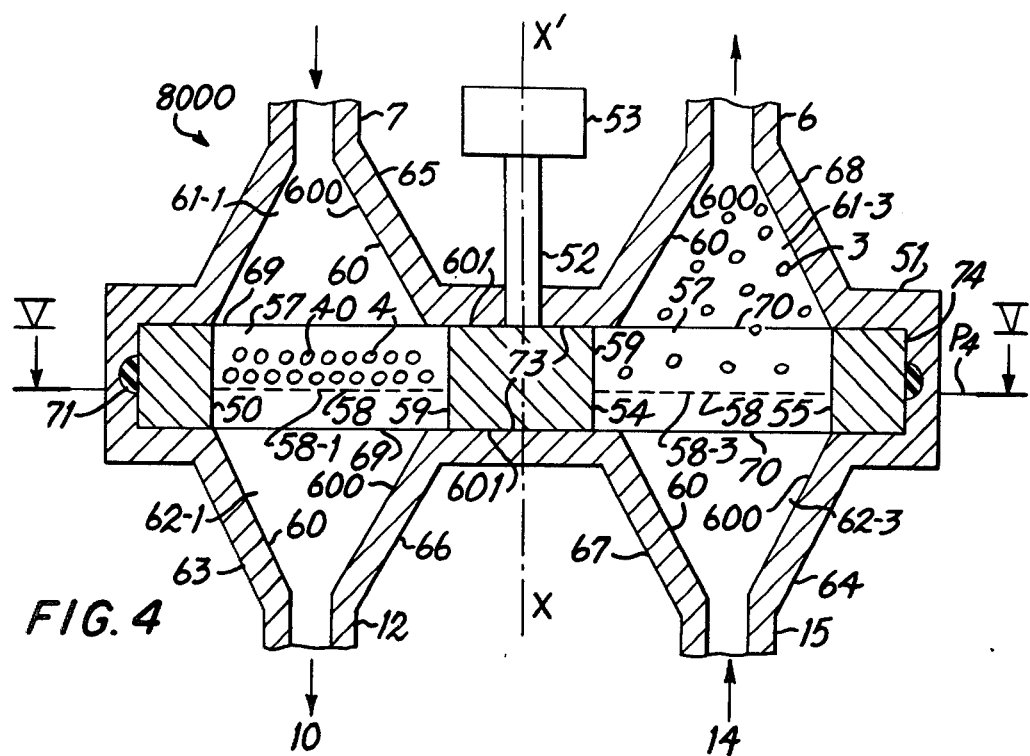
FIG. 4 shows, in cross section, a separator of the rotary filter type forming part of a device in accordance with the invention, the sectional plane of this figure being represented by the line IV—IV of FIG. 5.

FIG. 1 shows a device in accordance with the invention. This device 1 comprises a reaction chamber 2 through which a suspension 3 containing particles 4 and fluid 5 circulates. The circulation of the suspension 3 through the reaction chamber 2 takes place by means of an inlet conduit 6 and an outlet conduit 7. The circulating means, for example, one or more pumps, are not shown in FIG. 1. The particles 4 consist, for example, at least in part, of at least one active material which participates in the chemical and/or electrochemical reactions carried out in the chamber 2. The suspension 3 which emerges from the chamber 2 is introduced into a separator 8. This separator 8 separates the suspension 3 into two fractions:

one fraction, called the "concentration fraction," symbolically indicated by an arrow 9, which contains the greater part or all of the particles 4; this "concentrated fraction" can possibly contain fluid 5;

one fraction, called the "fluid fraction," symbolically indicated by an arrow 10 which contains the greater part or all of the fluid 5;

The "concentrated fraction" 9 flows out of the separator 8 via a conduit 11 and the "fluid fraction" 10 flows out of the separator 8 via a conduit 12 which discharges into a reservoir 13. The reservoir 13 contains fluid 5 and possibly particles 4 coming from the "fluid fraction" 10. A given amount of fluid 5 is placed in the reservoir 13 before the operation of the device 1.

A flow of the fluid 5 is brought about from the reservoir 13 via a conduit 15, this flow being symbolically indicated by an arrow 14. This flow 14 may possibly contain particles 4, the composition of the flow 14 being, for example, substantially the same as that of the "fluid fraction" 10. This flow 14 may furthermore be free of particles 4, for example, as a result of the settling of the particles 4 in the reservoir 13. the reaction product or products contained in the "fluid fraction" 10 and introduced into the reservoir 13 with the "fluid fraction" 10 remain in the reservoir 13 or are entrained by the flow 14.

The flow 14 is combined with the "concentrated fraction" 9 in a mixer 16 to form the suspension 3 which is introduced into the chamber 2 via the inlet conduit 6, the device 1 operating, for instance, continuously.

The separator 8 may comprise, for example, at least one filter and/or at least one cyclone and/or at least one settling tank. The mixer 16 can be formed, for example, of the combining of the conduits 11 and 15. The mixer 16 can furthermore possibly constitute a part of the separator 8; in this case the "concentrated fraction" 9 remains in the separator 8 until it is combined with the flow 14 to form the suspension 3, the device 1 being then possibly without conduit 11.

An apparatus 17 can possibly be used to introduce particles 4 into the suspension 3 before it penetrates into the reaction chamber 2. By way of example, this apparatus 17 may comprise a particle reservoir with a hopper and/or an Archimedes screw or be one of the erosion devices described in French patent applications Nos. 77-04652 and 78-10853 (corresponding to U.S. Pat. Nos. 4,166,154 and 4,214,711, respectively), these devices making it possible to erode a mass so as to produce particles.

The "concentrated fraction" 9 may possibly be introduced at least in part into an apparatus 18 for the regeneration of the particles contained in that fraction, for example, a chemical and/or electrochemical regeneration, the regenerated particles being in particular introduced into the suspension 3 before the latter is introduced into the chamber 2.

The device 1 in accordance with the invention results in the following advantages:

the fluid 5 flowing in the conduits 12, 15 and in the reservoir 13 contains only a small number of particles 4 or none at all. Under these conditions, no agitation is necessary in the reservoir 13, which can thus be of any shape. By way of example, if the device 1 is an electrochemical generator used on a vehicle, the reservoir 13 of any shape may be arranged in the dead spaces of the vehicle;

the amount of fluid 5 in contact with the particles 4 in the circuit formed by the chamber 2, the separator 8, the mixer 16 and the conduits 6, 7, 11 may be made small as compared with the total amount of fluid 5 in the entire device 1, which substantially decreases the risks of corrosion of the particles 4 by the fluid 5.

FIG. 2 shows another device 20 in accordance with the invention. This device 20 is, for example, an electrochemical generator of electrical current. The particles 4 are particles of zinc and the fluid 5 is a liquid alkaline electrolyte. The chamber 2 is a negative compartment in which the electrochemical oxidation of the zinc takes place, this negative compartment being associated electrochemically with at least one positive compartment 21, containing, for example, an air or oxygen diffusion electrode or a metallic oxide electrode. The cell 22 formed by the compartments 2 and 21 is, for example, similar to one of the cells described in the French patent applications published under numbers 2,319,982; 2,360,999; 2,361,000; 2,,361,001; and 2,361,002.

The separator 80 of this device 20 comprises two centrifugation cyclones 8-1 and 8-2 of known type, arranged in series. This arrangement is not limitative and the device 20 may possibly comprise a single cyclone or more than two cyclones arranged in series and/or in parallel. The suspension 3 coming from the compartment 2 is introduced into the cyclone 8-1. The "concentrated fraction" 9 coming from the base of the cyclone 8-1 flows into the conduit 11. The "fluid fraction," indicated symbolically by the arrow 10-1, which still contains a substantial number of particles 4 and comes from the upper part of the cyclone 8-1, is introduced into the cyclone 8-2. The "concentrated fraction," indicated symbolically by the arrow 9-2, which comes from the base of the cyclone 8-2, is introduced via the conduit 11-2 into the conduit 7 upstream of the cyclone 8-1, and the "fluid fraction" 10 coming from the upper portion of the cyclone 8-2 flows in the conduit 12 in the direction towards the reservoir 13.

The flow 14 of the electrolyte 5 emerging from the reservoir 13 via the conduit 15 is introduced into the reservoir 17 which contains fresh particles 4, where it mixes with a part of these particles. The suspension thus produced discharges through the conduit 15-1 and it receives the "concentrated fraction" 9 before it is introduced into the chamber 2 by means of the pump 26. The quantity of particles 4 in the suspension 3 introduced into the compartment 2 can thus be maintained practically constant during the operation of the device 1.

The pump 23 which is arranged on the conduit 7, the pump 24 which is arranged on the conduit 11, and the pump 25 which is arranged on the conduit 11-2 assure the flow of the particles 4 and of the electrolyte 5 in the separator 80.

The pumps 24 and 25 are preferably volumetric pumps, for example, peristaltic pumps, so as to assure a constant rate of flow for each of the "concentrated fractions" 9 and 9-2, whatever the viscosity of said fraction.

The operating conditions, which are in no way limitative, are for example the following, at room temperature, namely about 20° C.:

particles 4: average diameter 10 to 60 micrometers;

electrolyte 5: aqueous 6 N potassium hydroxide solution (6 mols of potassium hydroxide per liter);

characteristics of the suspension 3 in the conduit 7 at the entrance to the separator 80: total volumetric rate of flow 120 L/hour, namely a rate of flow of zinc particles of 15.6 kg/hour since this suspension contains about 0.13 kg/liter of zinc particles; the rate of flow of the suspension 3 and its composition in zinc particles are practically the same at the inlet and the outlet of the compartment 2 since the amount of zinc electrochemically oxidized upon each passage of the suspension in the compartment 2 is small;

characteristics of the "concentrated fraction" 9 emerging from the separator 80: total volumetric rate of flow 15 L/hour, namely a rate of flow of zinc particles of 15.3 kg/hour;

characteristics of the "fluid fraction" 10 introduced into the reservoir 13; total volumetric rate of flow 105 L/hour, namely a rate of flow of zinc particles of 0.3 kg/hour;

the amount of electrolyte 5 contained in the reservoir 13 and the quantity of zinc particles 4 introduced into the suspension 3 from the reservoir 17 are selected in such a manner as to assure the operation of the generator 20 for the desired length of time, the device 20 being without apparatus for eliminating or decreasing the amount of oxidized zinc, which thus remains in the electrolyte in the state of dissolved zinc and possibly precipitated zinc oxide. The concentration of dissolved oxidized zinc in the electrolyte should not exceed about 120 g of zinc/liter in the case of the aqueous 6 N potassium hydroxide solution in order to avoid passivation of the particles 4. This limit concentration may be substantially increased by means of additives, for example, alkaline silicates, and reach for example 180 g/liter in the case of 6 N postassium hydroxide solution.

FIG. 3 shows another device 30 in accordance with the invention. This device 30 comprises the chamber 2, the fluid reservoir 13 and a separator 800 comprising two fixed filters 31 and 32. Each of these filters 31 and 32 which are for example of identical shape has an inner enclosure 33 defined by a cylindrical filter cloth 34 and an annular outer enclosure 35 surrounding the cloth 34. These filters operate alternately in clogging and unclogging phase. In the device 30 shown in FIG. 3, the filter 31 is in clogging phase and the filter 32 in unclogging phase.

The inlet conduit 6 of the chamber 2 is connected to the opening $A_0$ of the valve A. This two-way valve A is in position $A_0A_1$ indicated symbolically by a solid line connecting the openings $A_0$ and $A_1$ of the valve A, this opening $A_1$ being connected to the inner enclosure 33 of the filter 32 by the conduits 36 and 37.

The outlet conduit 7 from the chamber 2 is connected to the opening $B_0$ of the valve B. This two-way valve B is in position $B_0B_1$, indicated symbolically by a solid line connecting the openings $B_0$ and $B_1$ of the valve B, this opening $B_1$ being connected to the inner enclosure 33 of the filter 31 by the conduits 38 and 39. The suspension 3 emerging from the chamber 2 is therefore in this way introduced into the inner enclosure 33 of the filter 31. The particles 4 form a clogging cake 40 applied against the filter cloth 34 of this filter 31, this cake constituting the "concentrated fraction." The fluid 5 which is practically free of particles 4 then passes into the outer enclosure 35 of the filter 31, this movement being indicated symbolically by the arrows 41. This fluid 5, which has been freed of the particles 4, constitutes the "fluid fraction" 10 which discharges from the outer enclosure 35 of the filter 31 via conduits 42, 43 connected to the opening $C_1$ of the two-way valve C. This valve C is in position $C_1C_0$ indicated symbolically by a solid line connecting the openings $C_1$ and $C_0$ of the valve C, the opening $C_0$ being connected to the reservoir 13 for the fluid 5 by the conduit 12. The discharge conduit 15 from the reservoir 13 is connected to the opening $D_0$ of the two-way valve D. This valve D is in position $D_0D_1$, indicated symbolically by a solid-line connecting the openings $D_0$ and $D_1$ of this valve. The opening $D_1$ of the valve D is connected to the outer enclosure 35 of the filter 32 by the conduits 44, 45. The flow 14 of fluid 5 coming from the reservoir 13 then penetrates through the filter cloth 34 of the filter 32 towards the inner enclosure 33 of this filter 32. It carries along and breaks up the cake 40 which is then formed of a previous clogging phase, to form a suspension 3 which is introduced into the chamber 2 via the conduits 37, 36, 6 and via the openings $A_0$ and $A_1$ of the valve A. Upon the following phase, the path of the fluid and of the particles is reversed. The filter 31 is in unclogging phase and the filter 32 in clogging phase. The valves A, B, C, D are then in positions $A_0A_2$, $B_0B_2$, $C_0C_2$, respectively, these positions being represented by dotted lines in FIG. 3. The suspension coming from the filter 31 is introduced into the chamber 2 via the conduits 39, 46, 6. The suspension emerging from the chamber 2 is introduced into the filter 32 by the conduits 7, 47, 37. The fluid 5 coming from the filter 32 is introduced into the reservoir 13 by the conduits 45, 48, 12. The flow 14 of fluid 5 coming from the reservoir 13 is introduced into the filter 31 via the conduits 15, 49, 42.

As described previously in the case of the device 20, by way of example the chamber 2 is a negative compartment of an electrochemical electric cell 22, the particles 4 are zinc particles and the fluid 5 is an aqueous alkaline electrolyte.

The operating conditions—in no way limitative—are, for example, the following:

rate of flow of suspension at the inlet of the filter in clogging phase: 120 L/hour, filtering surface of each filtering cloth 34 which is inert in the electrolyte 5: 30 cm$^2$, the meshes being of about 3 micrometers; this cloth can, of course, be replaced by a nonwoven, a porous membrane or a porous plate or grid;

number of clogging phases and number of unclogging phases for each filter: 15 per minute, which guarantees a composition in particles and a rate of flow which are practically constant for the suspension 3 introduced into the chamber 2;

the valves are controlled by a cam system (not shown in FIG. 3).

Since the direction of circulation of the electrolyte 5 in the reservoir 13 is constant, there is a stirring and constant renewal of this electrolyte.

It goes without saying that more than two filters 31, 32 can be used and that these filters may have an arrangement different from that which has been shown in FIG. 3, for example an arrangement such that the filter cloths 34 have a flat shape and/or that the suspension to be filtered is introduced into the outer enclosures 35 and the flow 14 into the inner enclosures 33.

Each of the separators in the devices in accordance with the invention may possibly comprise at least one movable filter, for example, a rotary filter, the formation of a cake of filtered particles taking place at one point of this filter and the breaking up of this cake by the fluid in order to form a suspension which is then introduced into the chamber taking place at another point of this filter.

Figure 5:
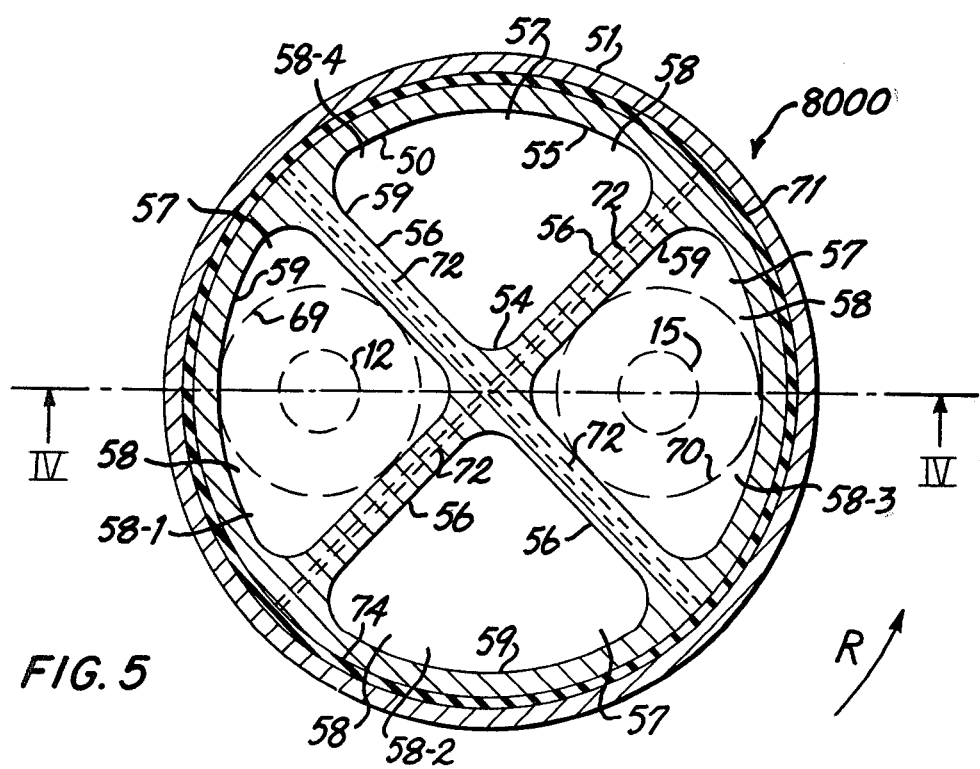
FIG. 5 shows, in cross section, the separator shown in FIG. 4, the sectional plane of this figure being represented by the line V—V of FIG. 4.

FIGS. 4 and 5 show by way of example one such filter 8000 of the rotary filter type, which can serve as separator 8 and mixer 16 in the device 1 which has been shown in FIG. 1 and described previously. This separator 8000 comprises a frame 50 of, for example, horizontal orientation, arranged in a block 51. The frame 50 has the shape of a disk of generally circular shape capable of turning in the block 51 around an axis XX', for example vertical, by means of a shaft 52. This shaft 52 is driven by a motor 53 (FIG. 4). The frame 50 comprises a central hub 54 on which the shaft 52 is fastened, and a circular edge 55. The hub 54 and the edge 55 are connected by four arms 56, which define four openings 57, for example of identical shape, in each of which a filtering membrane 58 is fastened.

The expression "membrane" is used in a very broad sense, and this membrane may, for example, be a porous film or a porous plate, a grid, a cloth, or several of these elements combined. These membranes are, for example, substantially oriented along a plane P4 perpendicular to the axis XX' (FIG. 4), the section plane of FIG. 5 corresponding substantially to this plane P4. Each membrane 58 is surrounded by faces 59 of the frame 50, these faces 59 and the inner faces 60 of the block 51 forming two chambers 61 and 62 corresponding to said membrane and separated by it. The four chambers 61 are arranged on the same side of the plane P4, for example above this plane, and the four chambers 62 are arranged on the other side of the plane P4, for example below this plane. The membranes 58 are numbered from 58-1 to 58-4 in the direction of rotation of the frame 50, this rotation being represented by the arrow R (FIG. 5). The chambers corresponding to these membranes are numbered 61-1 to 61-4 and 62-1 to 62-4, respectively. For clarity of the drawing, only four chambers have been shown in FIG. 4, namely the chambers 61-1, 62-1 separated by the membrane 58-1, and the chambers 61-3, 62-3 separated by the membrane 58-3.

The separator 8000 comprises a clogging apparatus 63 and an unclogging apparatus 64, these apparatus being practically opposite each other with respect to the axis XX' (FIG. 4). The clogging apparatus 63 comprises an inlet conduit 65 connected to the outlet conduit 7 of the reaction chamber 2. The suspension 3 thus introduced into the separator 8000 by the conduit 65 forms a cake 40 of filtered particles 4, this clogging cake being in contact with the membrane 58 in the upper chamber 61 which is connected to the conduit 65 in clogging phase.

The filtrate obtained, which is practically free of particles 4, passes into the lower chamber 62 corresponding to this membrane 58 and it is evacuated from this chamber 62 via a conduit 66 of the clogging apparatus 63, this conduit 66 being connected to the conduit 12 which leads into the reservoir 13. The cake 40 therefore constitutes the abovedefined "concentrated fraction" and the flow of the filtrate in the conduit 12 constitutes on its part the "fluid fraction" represented by the arrow 10 in FIG. 4. For clarity in the drawing, the reaction chamber 2 and the reservoir 13 have not been shown in FIGS. 4 and 5.

The unclogging apparatus 64 comprises an inlet conduit 67 connected to the conduit 15 which permits the flow 14 out of the reservoir 13. The fluid 5 containing a small number of particles 4 or none at all is thus introduced by the conduit 67 into a lower chamber 62. This fluid 5 passes through the membrane 58 corresponding to this chamber 62 and breaks up the cake 40 of this membrane 58 into particles 4.

The movements of the fluid 5 in the upper chamber 61 corresponding to this membrane 58 thus causes, in unclogging phase, the formation of a suspension 3 which is discharged from said chamber 61 via a conduit 68 of the unclogging apparatus 64. This conduit 68 is connected to the inlet conduit 6 of the reaction chamber 2. It goes without saying that by possibly reversing the directions of flow one could cause the formation of the cake 40 in a lower chamber 62.

The pump or pumps possibly used for the circulation of the fluid 5 and the particles 4 in the separator 8000 are not shown in FIGS. 4 and 5 in order not to interfere with the clarity of the drawing. The conduits 65, 66, 67, 68 of the apparatus 63, 64 have, for example, a flared shape, the flaring being directed towards the membranes 58.

The conduits 65, 66 of the apparatus 63 are arranged opposite each other with respect to the plane P4, and the same is true of the conduits 67, 68 of the apparatus 64. In this way one obtains a better distribution of the suspension 3 during the filtration and a better breaking up of the cake 40 during the unclogging, as well as a better entrainment of the suspension 3 formed during the unclogging. The inner faces 60 of the block 51 are arranged on opposite sides of the plane P4; they are flat and perpendicular to the axis XX', with the exception of their portions 600 corresponding to the inner faces of the conduits 65, 66, 67, 68. These flared portions 600 connect with the flat portions 601 of the faces 60 along lines, for example circles. These circles, shown in dashed line in FIG. 5, are marked 69 in the case of the clogging apparatus 63 and 70 in the case of the unclogging apparatus 64, said FIG. 5 also showing the conduits 12 and 15 in dashed lines.

The separator 8000 comprises so-called circular sealing means in the form, for example, of at least one joint 71 in the form of a body of revolution around the axis XX', and arranged between the frame 50 and the block 51. Certainty is thus had that the flow of the fluid 5 between the chambers 61, 62 corresponding to each membrane 58 takes place only through this membrane.

The separator 8000 furthermore comprises so-called radial sealing means in the form, for example, of joints 72 shown in dashed line in FIG. 5. These joints are borne by the faces 73 of the frame 50 along arms 56, each of these faces 73 which is flat and perpendicular to the axis XX' being arranged opposite a face 60 of the block 51. Each arm 56 thus bears two joints 72, one upper and the other lower, each connecting the shaft 52 or the axis XX' to the side face 74 of the frame 50. These radial sealing means are such that at least two of the arms 56 assure the tightness between, on the one hand, the chambers which are in communication with the clogging apparatus 63 and, on the other hand, the chambers which are in communication with the unclogging apparatus 64, this due to the radial joints 72 which are in contact with the faces 73 of the frame 50 and the faces 60 of the block 51.

Upon the rotation of the frame 50, each pair of chambers 61, 62 corresponding to a given membrane 58 is therefore alternatively in communication with the clogging apparatus 63 and with the unclogging apparatus 64.

Thus in the position shown in FIGS. 4 and 5, the pair of chambers 61-1, 62-1 corresponding to the membrane 58-1 is in communication with the clogging apparatus 63 while the pair of chambers 61-3, 62-3, corresponding to the membrane 58-3 is in communication with the unclogging apparatus 64. No pair of chambers 61, 62 corresponding to a given membrane can be in communication at the same time with both apparatus 63, 64, which assures uniform operation of the separator 8000.

It should be pointed out that upon the rotation of the frame 50, two adjacent pairs of chambers, for example the pair of chambers 61-1, 62-1 and the pair of chambers 61-2, 62-2 can at the same time be in communication with the same apparatus 63 or 64 when the connecting lines 69, 70 pass through the joints 72 which separate these two pairs.

The separator 8000 can be used, for example, in combination with one or more chambers 2 which operate as negative compartments of cells 22, the particles 4 being zinc particles and the fluid 5 being an aqueous alkaline electrolyte, as previously described.

UNITED STATES PATENT AND TRADEMARK OFFICE
CERTIFICATE OF CORRECTION

PATENT NO. : 4,283,466

DATED : August 11, 1981

INVENTOR(S) : Jean-Yves Machat

It is certified that error appears in the above—identified patent and that said Letters Patent is hereby corrected as shown below:

Col. 1, line 35½, "of" (second occurrence) should read -- to --. Col. 3, line 6, "the reaction" should read -- The reaction --. Col. 6, line 1, after "$C_0C_2$," insert -- $D_0D_2$, --.

Signed and Sealed this

First Day of December 1981

[SEAL]

Attest:

GERALD J. MOSSINGHOFF

Attesting Officer

Commissioner of Patents and Trademarks